(12) United States Patent
Chen et al.

(10) Patent No.: US 10,142,449 B2
(45) Date of Patent: Nov. 27, 2018

(54) ELECTRONIC DEVICE WITH ROTATABLE BATTERY COVER

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Ching-Feng Chen, New Taipei (TW); Ji-Ping Wu, Shenzhen (CN); Long-Fong Chen, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/814,278

(22) Filed: Nov. 15, 2017

(65) Prior Publication Data

US 2018/0309862 A1 Oct. 25, 2018

(30) Foreign Application Priority Data

Apr. 20, 2017 (CN) .......................... 2017 1 0259256

(51) Int. Cl.
*H04M 1/02* (2006.01)
*H01M 2/10* (2006.01)

(52) U.S. Cl.
CPC ....... *H04M 1/0262* (2013.01); *H01M 2/1066* (2013.01)

(58) Field of Classification Search
CPC ............. H04M 1/0262; H01M 2/1022; H01M 2220/30; H01M 10/613; H01M 10/6551; G06F 1/1635; G06F 1/166
See application file for complete search history.

(56) References Cited

U.S. PATENT DOCUMENTS

| | | | | |
|---|---|---|---|---|
| 6,054,839 A * | 4/2000 | Guimier | .............. | H04M 1/0216 320/107 |
| 6,256,192 B1 * | 7/2001 | Shannon | ............... | G06F 1/1616 312/223.2 |
| 6,284,407 B1 * | 9/2001 | Murray | ............... | H01M 2/1022 429/100 |
| 6,480,373 B1 * | 11/2002 | Landry | ................. | G06F 1/1616 16/308 |
| 6,700,774 B2 * | 3/2004 | Chien | ................... | G06F 1/1616 361/679.2 |
| 6,865,075 B2 * | 3/2005 | Oakley | ................. | G06F 1/1618 345/173 |
| 7,126,588 B2 * | 10/2006 | Oakley | ................. | G06F 1/1618 345/169 |
| 7,308,290 B2 * | 12/2007 | Johnson | ................. | H04B 1/385 224/268 |
| 7,686,261 B2 * | 3/2010 | Shi | ........................ | G06F 1/1616 248/166 |

(Continued)

*Primary Examiner* — Devan Sandiford
(74) *Attorney, Agent, or Firm* — ScienBiziP, P.C.

(57) ABSTRACT

An electronic device includes a casing defining a receiving space in a back surface thereof. A receiving space is defined in an edge portion of the back surface. The receiving space is configured for receiving a battery therein. A cover is rotationally secured in the receiving space. The cover in a closed state is fully received in the receiving space. The cover in an open state is not fully received in the receiving space. The cover is rotatable between the closed state and the open state.

9 Claims, 5 Drawing Sheets

(56) References Cited

U.S. PATENT DOCUMENTS

| | | | | | |
|---|---|---|---|---|---|
| 8,054,617 | B2* | 11/2011 | Kuang | .................. | F16M 11/10 361/679.22 |
| 8,128,054 | B2* | 3/2012 | Li | .................. | G06F 1/166 248/163.1 |
| 8,203,832 | B2* | 6/2012 | Szabolcsi | .................. | G06F 1/1616 248/917 |
| 8,247,102 | B2* | 8/2012 | Hua | .................. | H04M 1/04 429/100 |
| 8,704,487 | B2* | 4/2014 | Tracy | .................. | F16M 11/10 320/114 |
| 9,013,865 | B2* | 4/2015 | Chen | .................. | H05K 5/0217 361/679.21 |
| 9,223,347 | B2* | 12/2015 | Hsu | .................. | G06F 1/1637 |
| 9,683,693 | B2* | 6/2017 | Yu | .................. | F16M 13/005 |
| 9,874,900 | B2* | 1/2018 | Mehandjiysky | .................. | G06F 1/1626 |
| 2003/0022633 | A1* | 1/2003 | Chen | .................. | H04B 1/3883 455/575.1 |
| 2004/0001997 | A1* | 1/2004 | Zatezalo | .................. | G06F 1/163 429/96 |
| 2004/0189011 | A1* | 9/2004 | Ahn | .................. | H01M 2/1022 292/1 |
| 2004/0191614 | A1* | 9/2004 | Iwasaki | .................. | G06F 1/1601 429/96 |
| 2004/0224220 | A1* | 11/2004 | Wang | .................. | H01M 2/1066 429/96 |
| 2006/0148539 | A1* | 7/2006 | Johnson | .................. | H04B 1/385 455/575.1 |
| 2006/0287013 | A1* | 12/2006 | Kim | .................. | H01M 2/0207 455/575.1 |
| 2008/0042448 | A1* | 2/2008 | Ge | .................. | E05C 1/10 292/137 |
| 2008/0193837 | A1* | 8/2008 | Lu | .................. | H01M 2/1066 429/163 |
| 2008/0253066 | A1* | 10/2008 | Tracy | .................. | F16M 11/10 361/601 |
| 2010/0081043 | A1* | 4/2010 | Huang | .................. | H01M 2/1066 429/96 |
| 2010/0088861 | A1* | 4/2010 | Chang | .................. | H04M 1/0202 24/458 |
| 2010/0159311 | A1* | 6/2010 | Li | .................. | H01M 2/1022 429/100 |
| 2012/0147536 | A1* | 6/2012 | Sa | .................. | G06F 1/1632 361/679.01 |
| 2012/0325986 | A1* | 12/2012 | Chen | .................. | F16M 11/10 248/122.1 |
| 2013/0335891 | A1* | 12/2013 | Chen | .................. | H05K 5/0217 361/679.01 |
| 2014/0321041 | A1* | 10/2014 | Hsu | .................. | G06F 1/1637 361/679.26 |
| 2017/0027069 | A1* | 1/2017 | Yu | .................. | F16M 13/005 |
| 2017/0235340 | A1* | 8/2017 | Jung | .................. | G06F 1/1635 361/679.26 |

* cited by examiner

ELECTRONIC DEVICE WITH ROTATABLE BATTERY COVER

CROSS-REFERENCE TO RELATED APPLICATIONS

This application claims priority to Chinese Patent Application No. 201710259256.8 filed on Apr. 20, 2017, the contents of which are incorporated by reference herein.

FIELD

The subject matter herein generally relates to an electronic device having a rotatable battery cover.

BACKGROUND

As electronic devices have become smaller and thinner, heat dissipation of the battery becomes more important.

BRIEF DESCRIPTION OF THE DRAWINGS

Implementations of the present technology will now be described, by way of example only, with reference to the attached figures.

DETAILED DESCRIPTION

Figure 1:
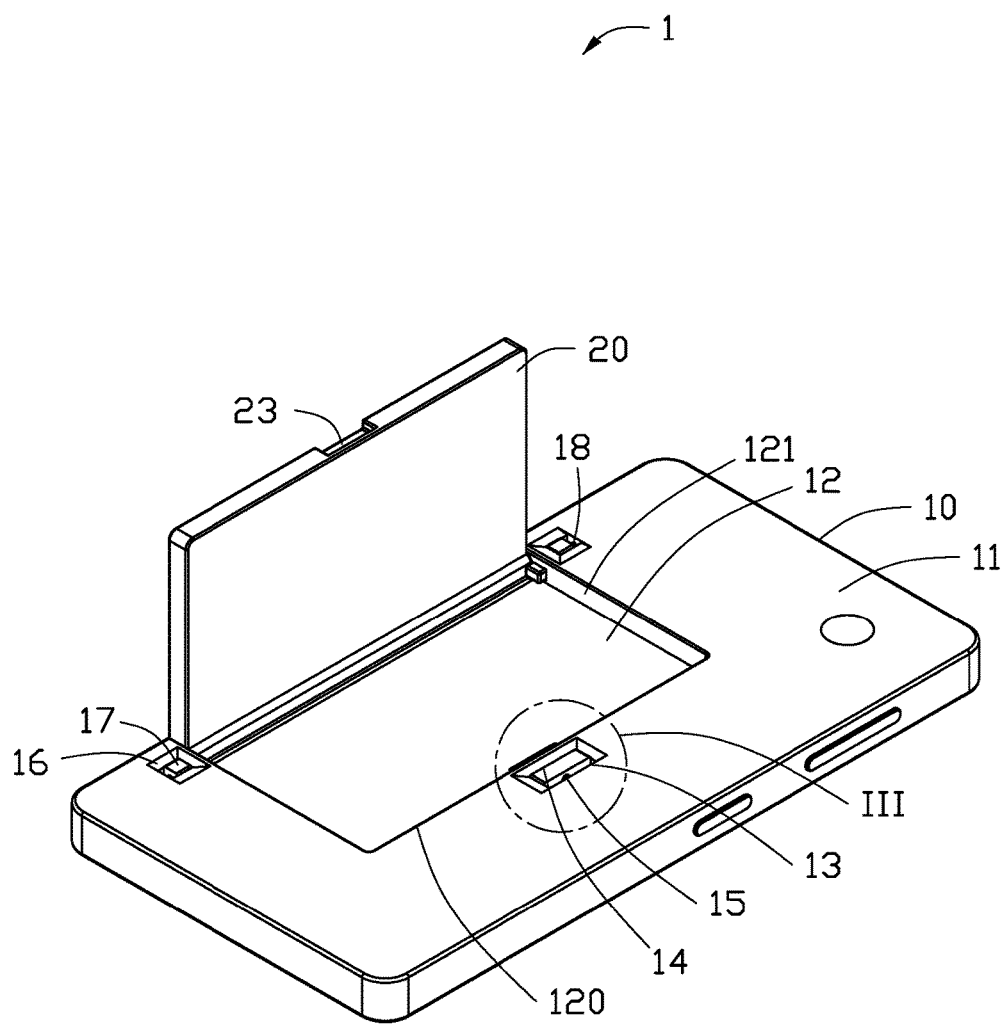
FIG. 1 is an assembled, isometric view of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of an electronic device 1. The electronic device 1. The electronic device 1 can be a cell phone, a tablet, or any other portable electronic device. In the illustrated embodiment, the electronic device 1 is a cell phone. The electronic device 1 can include a casing 10 and a cover 20.

Figure 2:
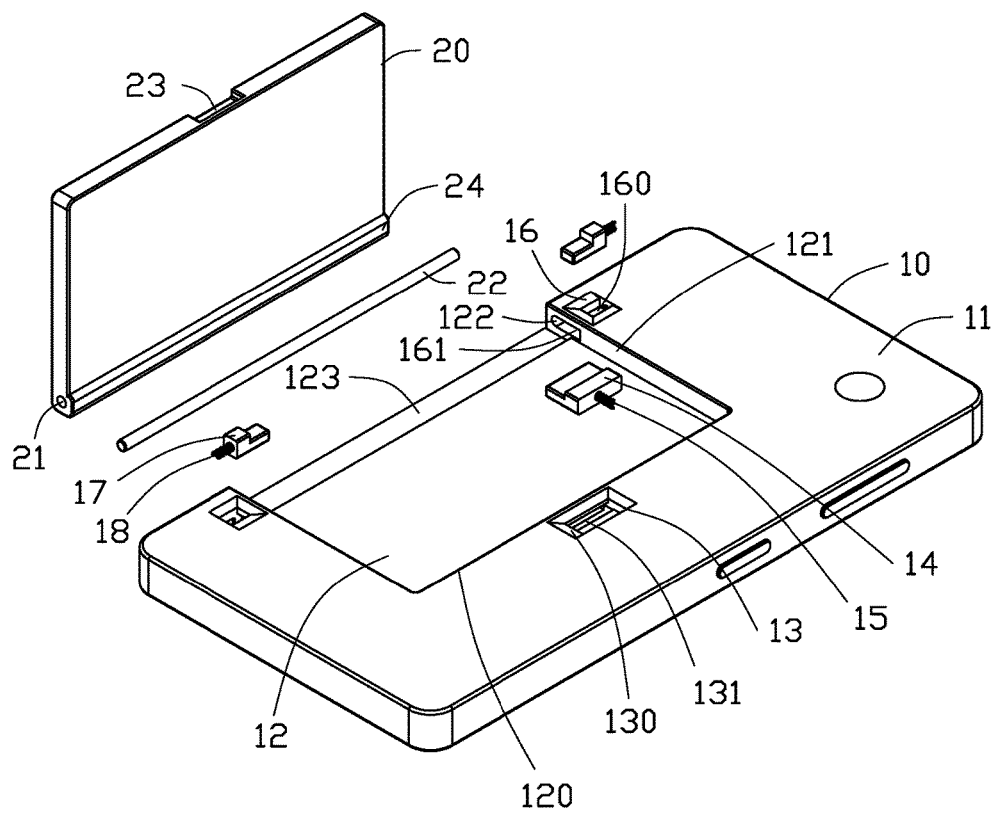
FIG. 2 is an exploded view of FIG. 1.

As illustrated in FIG. 2, the casing 10 can include a back surface 11. A receiving groove 12 can be defined in an edge portion of the back surface 11 for receiving a battery (not labeled) of the electronic device 1. In the illustrated embodiment, the receiving groove 12 is defined along a longer side of the electronic device 1, but in other embodiments can be defined along a shorter side of the electronic device 1. The cover 20 can be fully received in the receiving groove 12 for covering the battery. A size of the cover 20 can be substantially equal to a size of the receiving groove 12.

A through hole 21 can be defined in the cover 20. An axle 22 can extend through the through hole 21 to rotationally couple the cover 20 to the casing 10. A length of the axle 22 is longer than a length of the through hole 21. The receiving groove 12 can include a first sidewall 120 and a pair of second sidewalls 121. The first sidewall 120 can be located between the pair of second sidewalls 121. Each of the second sidewalls 121 can define a receiving hole 122 therein for receiving an end of the axle 22, thereby rotationally coupling the axle 22 to the casing 10.

The cover 20 can be rotated between a closed state and an open state. In the closed state, the cover 20 is fully received in the receiving groove 12 to cover the battery. When in use, the cover 20 can be rotated about the axle 22 to the open state to uncover the battery, thereby allowing the battery to dissipate heat.

Figure 3:
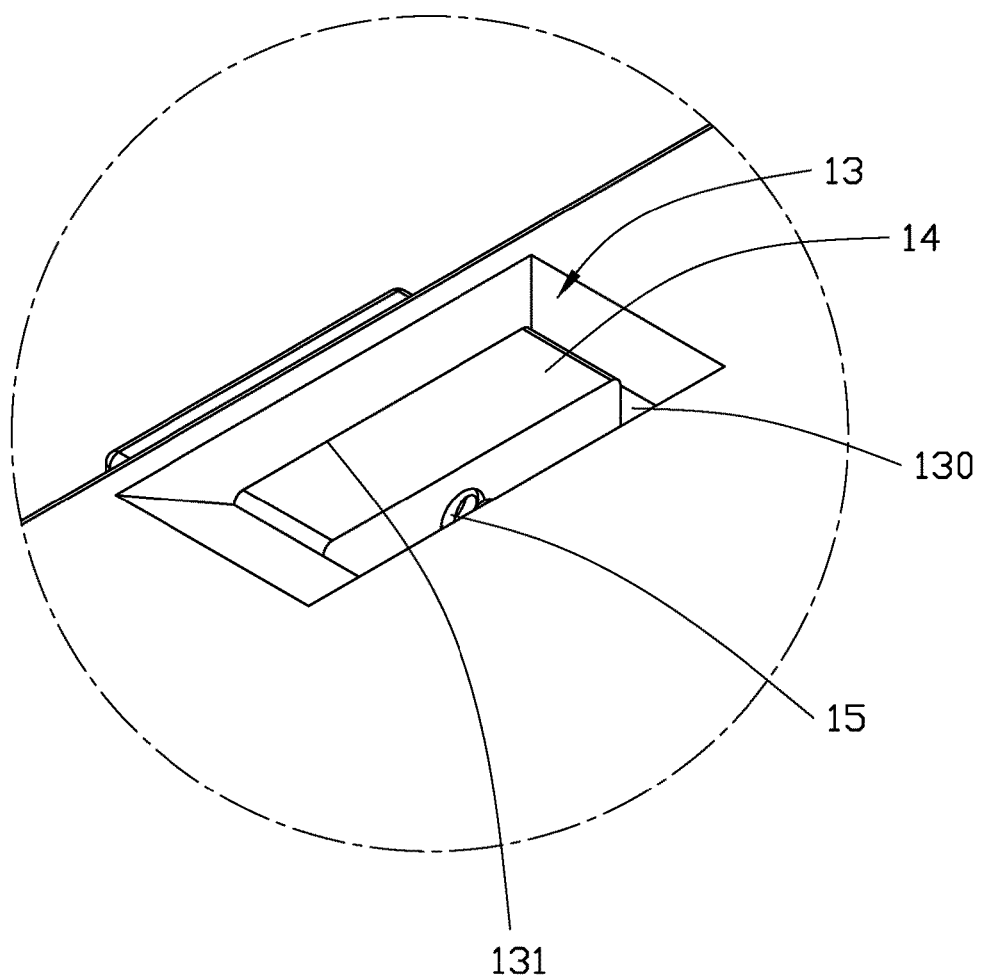
FIG. 3 is a close-up view of circled portion III of FIG. 1.

As illustrated in FIGS. 2 and 3, a first groove 13 can be defined in the back surface 11. The first groove 13 can include a first opening 130 and a second opening 131. The first opening 130 can be defined on the back surface 11, and the second opening 131 can be defined on the first sidewall 120 of the receiving groove 12.

The casing 10 can further include a latching member 14 and a first elastic member 15. The latching member 14 and the first elastic member 15 are received in the first groove 13. The latching member 14 can be substantially L-shaped and protrude through the first opening 130 and the second opening 131. A first end of the first elastic member 15 can be fixed to the latching member 14, and a second end of the first elastic member 15 can be fixed to an inner wall of the first groove 13.

A notch 23 can be defined in an edge portion of the cover 20 adjacent to the first groove 13. The latching member 14 can be elastically latched in the notch 23 when the cover 20 is in the closed state.

The portion of the latching member 14 protruding through the first opening 130 can be operated by a user to move the latching member 14 away from the cover 20, thereby unlatching the latching member 14 from the notch.

At least one second groove 16 can be defined in the back surface 11 adjacent to the axle 22 of the cover 20. In the illustrated embodiment, there are two second grooves 16, each second groove 16 being defined adjacent to a corresponding end of the axle 22. The second groove 16 can include a third opening 160 and a fourth opening 161. The third opening 160 is defined on the back surface 11, and the fourth opening 161 is defined on the corresponding adjacent second sidewall 121.

The casing 10 can further include a resisting member 17 and a second elastic member 18. The resisting member 17 and the second elastic member 18 are received in the second groove 16. The resisting member 17 can be substantially L-shaped and protrude through the third opening 160 and the fourth opening 161. A first end of the second elastic member 18 can be fixed to the resisting member 17, and a second end of the second elastic member 18 can be fixed to an inner wall of the second groove 16.

When the cover 20 is in the closed state, the portion of the resisting member 17 protruding through the fourth opening 161 is made flush with the corresponding second sidewall 121. The portion of the resisting member 17 protruding through the third opening 160 can be operated by a user to move the resisting member 17 away from the cover 20, thereby allowing the cover 20 to be removed from the closed state.

Figure 4:
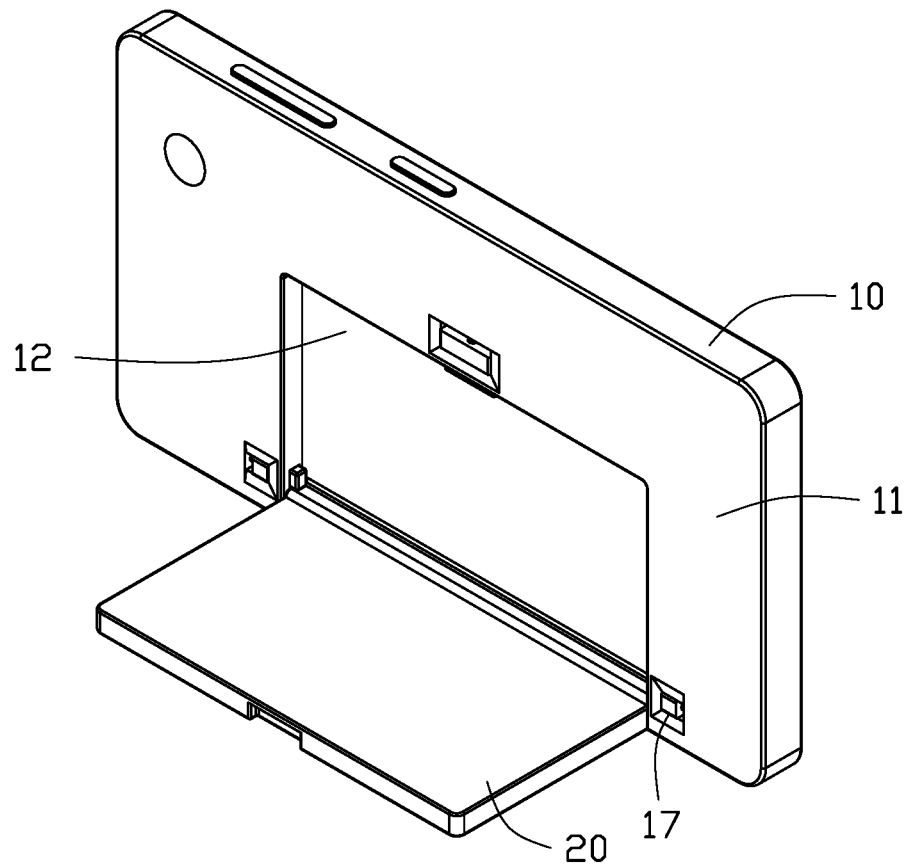
FIG. 4 is an isometric view of the electronic device with a cover in a first open stated.

As illustrated in FIGS. 2 and 4, the open state of the cover 20 can include a first open state. The first open state is when the cover 20 is 90 degrees relative to the casing 10. When a user rotates the cover 20 to the first open state, the resisting members 17 under the influence of the second elastic members 18 can protrude out of the fourth openings 161 to keep the cover 20 in the first open state. In the first open state, the cover 20 can support the casing 10 to be viewed at an angle by a user, for example.

Figure 5:
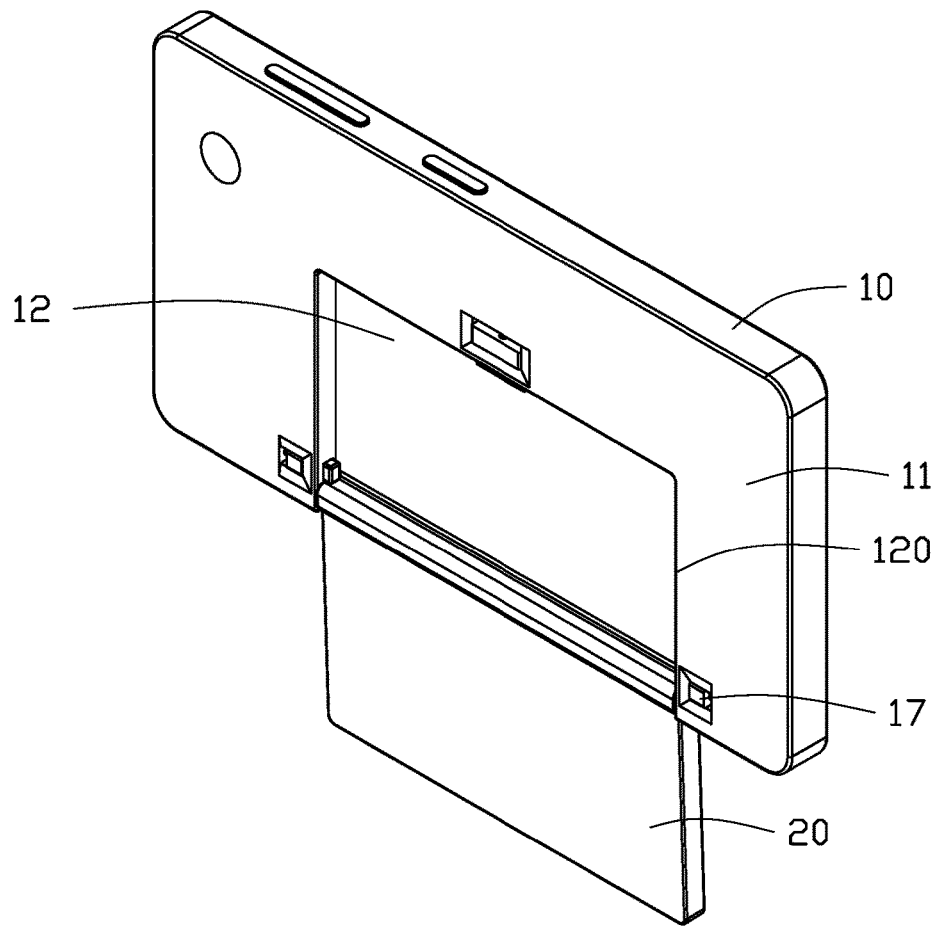
FIG. 5 is similar to FIG. 4, but shows the cover in a second open state.

As illustrated in FIGS. 2, 4, and 5, the open state of the cover 20 can further include a second open state. The second open state is when the cover 20 is 180 degrees relative to the casing 10. To rotate the cover 20 from the first open state to the second open state, a user can operate the resisting members 17 to move away from the cover 20 to release the cover 20, thereby allowing the cover 20 to rotate to the second open state. When the cover 20 is in the second open state, the resisting members 17 can be released to elastically resist against the cover 20 to hold the cover 20 in the second open state. In the second open state, a user can hold the cover 20 to take a picture, record a video, or the like.

Referring again to FIG. 2, a pivoting groove 123 can be defined in an edge portion of the receiving groove 12 away from the first sidewall 121 of the receiving groove 12. An edge of the cover 20 adjacent to the axle 22 can include a pivoting portion 24 rotationally received in the pivoting groove 123. The pivoting groove 123 and the pivoting portion 24 can both be arc-shaped to facilitate smooth rotation of the cover 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
   a casing defining a receiving space in a back surface thereof, the receiving space being defined on an edge portion of the back surface, the receiving space configured for receiving a battery therein; and
   a cover rotationally secured in the receiving space;
   wherein the cover in a closed state is fully received in the receiving space to secure the battery;
   wherein the cover in a first open state is at a 90 degree angle relative to the casing, the cover in the first open state is able to support the electronic device at an angle to be viewed and to uncover the battery to release heat from the battery;
   wherein the cover in a second open state is at a 180 degree angle relative to the casing to uncover the battery to release heat from the battery; and
   wherein the cover is rotatable between the closed state, the first open state, and the second open state;
   wherein the cover comprises an axle received in a through hole defined in the cover, the axle received in the receiving space to rotationally secure the cover in the receiving space;
   wherein the receiving space comprises a first wall and a pair of second walls, opposite ends of the axle being secured in the pair of second walls;
   wherein each of the pair of second walls has a receiving hole defined therein, each end of the axle is received in a corresponding receiving hole to rotationally secure the axle in the receiving groove; wherein a first groove is defined in the back surface, the first groove comprises a first opening and a second opening, the first opening is defined on the back surface, and the second opening is defined on the first sidewall;
   wherein the casing comprises a latching member and a first elastic member, the latching member and the first elastic member are received in the first groove, the latching member is L-shaped and protrudes through the first opening and the second opening, a first end of the first elastic member is fixed to the latching member, a second end of the first elastic member is fixed to an inner wall of the first groove;
   wherein a notch is defined in an edge portion of the cover adjacent to the first groove, the latching member is elastically latched in the notch when the cover is in the closed state, the latching member is moved by an external force to unlatch from the notch to allow the cover to be rotated.

2. The electronic device of claim 1, wherein at least one second groove is defined in the back surface adjacent to the axle of the cover, the second groove comprises a third opening and a fourth opening, the third opening is defined on the back surface, the fourth opening is defined on the adjacent second sidewall of the receiving groove.

3. The electronic device of claim 2, wherein the casing further comprises a resisting member and a second elastic member, the resisting member and the second elastic member are received in the second groove, the resisting member is L-shaped and protrudes through the third opening and the fourth opening, a first end of the second elastic member is fixed to the resisting member, a second end of the second elastic member is fixed to an inner wall of the second groove.

4. The electronic device of claim 3, wherein two second grooves are defined in the back surface, each second groove is adjacent to one of the second sidewalls of the receiving groove, each second groove has the resisting member and the second elastic member received therein.

5. The electronic device of claim 3, wherein a pivoting groove is defined in an edge portion of the receiving groove away from the first sidewall of the receiving groove, an edge of the cover adjacent to the axle comprises a pivoting portion rotationally received in the pivoting groove.

6. The electronic device of claim 5, wherein the pivoting groove and the pivoting portion are arc-shaped.

7. The electronic device of claim 5, wherein when the cover is in the closed state, the latching member is latched in the notch of the cover, and the resisting member is flush with the corresponding second sidewall and resists against a side of the cover; when the cover is rotated to the first open state or the second open state, the resisting portion under the elastic force of the second elastic member protrudes through the fourth opening to hold the cover in the open state.

8. The electronic device of claim 7, wherein the resisting member is moved by an external force to be flush with the second sidewall to allow the cover to be rotated between the first open state and the second open state, and the resisting member is moved by an external force to be flush with the second sidewall to allow the cover to be rotated from the first open state to the closed state.

9. The electronic device of claim 1, wherein a size of the cover corresponds to a size of the receiving space.

* * * * *